United States Patent
Aspar et al.

(10) Patent No.: US 6,853,414 B2
(45) Date of Patent: Feb. 8, 2005

(54) FLAT LIQUID CRYSTAL, SCREEN OPERATING IN REFLECTIVE MODE AND METHOD FOR MANUFACTURING THIS SCREEN

(75) Inventors: Bernard Aspar, Rives (FR); Jean-Frédéric Clerc, Brie (FR)

(73) Assignee: Commissariat a l'Energie Atomique, Paris (FR)

( * ) Notice: Subject to any disclaimer, the term of this patent is extended or adjusted under 35 U.S.C. 154(b) by 34 days.

(21) Appl. No.: 10/433,543

(22) PCT Filed: Oct. 7, 2002

(86) PCT No.: PCT/FR02/03409

§ 371 (c)(1),
(2), (4) Date: Jun. 4, 2003

(87) PCT Pub. No.: WO03/032057

PCT Pub. Date: Apr. 17, 2003

(65) Prior Publication Data

US 2004/0084401 A1 May 6, 2004

(30) Foreign Application Priority Data

Oct. 9, 2001 (FR) .............................................. 01 12953

(51) Int. Cl.$^7$ ............................................. G02F 1/1335
(52) U.S. Cl. ........................ 349/96; 349/106; 349/113
(58) Field of Search ............................ 349/96, 106, 113

(56) References Cited

U.S. PATENT DOCUMENTS

| 5,936,693 A | * | 8/1999 | Yoshida et al. .............. 349/139 |
| 6,130,736 A | | 10/2000 | Sasaki et al. |
| 6,262,787 B1 | * | 7/2001 | Kamoi et al. .................. 349/96 |

FOREIGN PATENT DOCUMENTS

| EP | 1 122 585 A1 | 8/2001 |
| JP | 60-112022 | 6/1985 |
| JP | 05-27224 | 2/1993 |
| JP | 05-249422 | 9/1993 |
| JP | 11-249108 | 9/1999 |
| JP | 2001-42317 | 2/2001 |
| JP | 2001-83494 | 3/2001 |

OTHER PUBLICATIONS

Shimoda, Tatsuya et al., "Polysilicon TFT on Plastics," Flat Panel Display Technology And Display Metrology II, Proceedings of SPIE, vol. 4295, 2001, pp. 52–59.

* cited by examiner

Primary Examiner—Robert H. Kim
Assistant Examiner—P. R. Akkapeddi
(74) Attorney, Agent, or Firm—Thelen Reid & Priest, LLP

(57) ABSTRACT

This invention consists of transforming a liquid crystal flat screen, normally designed to operate in transmissive mode, to enable it to operate in reflective mode so as to consume less energy. To do this, some screen elements inserted between the liquid crystal layer (3) and the reflector (9) must satisfy a specific relation.

26 Claims, 1 Drawing Sheet

FLAT LIQUID CRYSTAL, SCREEN OPERATING IN REFLECTIVE MODE AND METHOD FOR MANUFACTURING THIS SCREEN

CROSS-REFERENCE TO RELATED APPLICATION

This application claims priority based on International Patent Application No. PCT/FR02/03409, entitled "Flat Liquid Crystal, Screen Operating In Reflective Mode And Method For Manufacturing This Screen" by Bernard Aspar and Jean-Frederic Clerc, which claims priority of French Application No. 01/12953, filed on Oct. 9, 2001, and which was not published in English."

TECHNICAL DOMAIN

This invention relates to a flat liquid crystal screen operating in reflective mode. It also relates to a method for making such a flat screen.

STATE OF PRIOR ART

Future portable systems (for example portable telephones, smart cards or personal assistants of the future) include an increasing number of functions. These systems, for example such as personal assistants of the future, are built up using many technological bricks. These technological bricks include liquid crystal screens, the operating system, the microprocessor, and the batteries. The screens are the components that occupy the largest surface area and their integration into the system is an important point.

These objects can only be developed in mass production if their cost reduces or if they can perform different functions. At the present time, most active matrix flat screens operate in transmission mode, which requires a non-negligible energy consumption. Other technologies have been developed to solve this problem. These technologies can produce screens that operate in reflective mode, but they are much more complex than technologies used for transmission screens.

Therefore one of the challenges to be overcome with flat screens is to make screens that consume less, at a cost lower than the cost of known reflective screens.

Furthermore, most flat liquid crystal screens are made on glass supports. Glass has many advantages (size, cost, etc.). However, it does have one main disadvantage, which is its shock resistance. Components or devices made on this type of support then require additional protection devices so that they can be integrated in portable systems. In order for the integration of these components to be maximized, it is useful to integrate these components onto the final support. In many cases, this support may advantageously be made of plastic. In this case, it would be particularly interesting, for example to obtain a screen on a plastic support that combines low manufacturing cost with low weight and good shock resistance compared with glass. This application is particularly attractive for new generation portable telephones. These liquid crystal and active matrix screens require the use of polarizers that are themselves usually made of plastic. Advantageously, it would be very interesting to be able to use them for an active function (polarization of light) and also for a passive function (flexible and robust mechanical support).

Furthermore, for portable systems, for example smart cards and also for personal assistants, it is also necessary that components should be thin, to solve weight and flexibility problems (to have a thickness similar to the smart card).

In another domain, different techniques are known for transferring layers from one support to another support. For example, there are techniques divulged by T. HAMAGUCHI et al. in IEDM Proc., 1985, page 688. These techniques are very useful since they can be used to transfer a layer made from a first substrate (for example an SOI type substrate) to another substrate. However, they involve consumption of the first substrate that is destroyed during the process. Furthermore, they cannot be used to make a uniform transfer of a thin film, which due to the presence of a buried layer of silicon oxide can be used as a stop layer for stopping chemical etching.

Other techniques have been proposed more recently for transferring TFT transistors (made of polysilicon on a glass substrate) onto plastic substrates. Further information about this subject can be found in the article by S. UTSUNOMIYA et al. in IDS Proc. 2000, page 916 or in document EP-A-0 924 769. These methods are based on the creation of a separation layer on a substrate (usually amorphous silicon) that, after components have been made on this layer, enables separation and transfer onto another substrate. In this case, separation (or exfoliation) is obtained by irradiation with light (typically a laser type beam). However, this type of irradiation is difficult to control for large surfaces. Non-homogeneous illumination must cause homogenous exfoliation, which can deteriorate the surface film. This causes a non-negligible technological difficulty.

There are various possible transfer methods, including the use of methods of transferring thin layers of materials containing or not containing all or some of a microelectronic component. These methods are based on the creation of a brittle layer buried in a material starting from the introduction of one or several gas species. Further information about this subject is given in documents FR-A-2 681 472 (corresponding to American U.S. Pat. No. 5,374,564), FR-A-2 748 851 (corresponding to American U.S. Pat. No. 6,020,252), FR-A-2 748 850 (corresponding to American U.S. Pat. No. 6,190,998) and FR-A-2 773 261. These methods are usually used with the purpose of detaching an entire film from an initial substrate to transfer it onto a support. The thin film obtained then contains part of the substrate. These films may be used as active layers for making electronic or optical components. The main advantage of these methods is that they can be used to obtain thin films of monocrystalline substrates on different supports. These films may contain all or part of a component.

PRESENTATION OF THE INVENTION

A first purpose of the invention consists of transforming a liquid crystal flat screen, normally designed to operate in transmissive mode, to enable it to operate in reflective mode so as to consume less energy. Thus, it is possible to use "Twisted Nematic", "Super Twisted Nematic", "Vertically Aligned" or "In Plane Switching" type active matrix flat screens in reflective mode, although these screens preferably operate in transmissive mode.

In one particular embodiment, the invention can also be used to obtain screens on flexible, robust, inexpensive supports so that the screen can be more easily integrated into its final support.

Therefore, the purpose of the invention is a liquid crystal flat screen operating in reflective mode comprising a liquid crystal layer with thickness $e_1$ confined between first transparent confinement means and second transparent confinement means, the first transparent confinement means being provided with an outer face that will receive incident light arriving on the screen, and an inner face supporting first transparent electrodes used to apply an electric field to the liquid crystal, the second transparent confinement means being provided with an outer face supporting a reflector that will reflect light passing through the second transparent confinement means, and an inner face supporting second transparent electrodes for application of an electric field to the liquid crystal, characterized by one of the following alternatives:

either, the second transparent confinement means comprise a layer between their inner and outer faces, forming a colored filter with thickness $e_2$ and composed of a mosaic of elements with width l, a layer of glass or $SiO_2$ with thickness $e_3$ and refraction index n and a layer forming a polarizer with thickness $e_4$, the parameters $e_1$, $e_2$, $e_3$, $e_4$ and l being chosen such that:

$$\frac{e_1}{2} + e_2 + e_3 + e_4 < \frac{n \times l}{4},$$

or, the first transparent confinement means comprise a layer between their inner and outer faces forming a colored filter composed of a mosaic of elements with width l, and the second transparent confinement means comprise a glass or $SiO_2$ layer between their inner and outer faces with thickness $e_3$ and refraction index n, and a layer forming a polarizer with thickness $e_4$, the parameters $e_1$, $e_3$, $e_4$ and l being chosen such that:

$$\frac{e_1}{2} + e_3 + e_4 < \frac{n \times l}{4}.$$

The reflector may be a metallic film.

Advantageously, the layer forming the polarizer of the second transparent confinement means is made of plastic.

Preferably, the first transparent confinement means comprise a glass strip and a layer forming a polarizer between their inner and outer faces. This layer forming a polarizer may be made of plastic material.

Advantageously, the first transparent confinement means or the second transparent confinement means support an active matrix associated with the transparent electrodes supported by these transparent confinement means.

Another purpose of the invention is a method for manufacturing a liquid crystal flat screen comprising a liquid crystal layer confined between the first transparent confinement means and the second transparent confinement means, the method comprising the following steps:

make a structure comprising said first transparent confinement means facing a support, said first transparent confinement means being provided with an outer face external to the structure that will receive light incident to the screen, and a face internal to the structure supporting first transparent electrodes for application of an electric field to the liquid crystal, the part of the support facing the first transparent confinement means being made of glass or $SiO_2$ with a refraction index n and supporting a layer forming a colored filter with thickness $e_2$ and composed of a mosaic of elements with width l, the layer forming the colored filter supporting second transparent electrodes for application of an electric field to the liquid crystal, a layer of liquid crystal with thickness $e_1$ being confined between the first transparent confinement means and the layer forming a colored filter, thinning of the support to keep only a glass or $SiO_2$ layer with thickness $e_3$ and refraction index n adjacent to the layer forming a colored filter, gluing of a layer forming a polarizer with thickness $e_4$ on the free face of the glass layer or $SiO_2$ layer, the parameters $e_1$, $e_2$, $e_3$, $e_4$ and l being chosen such that:

$$\frac{e_1}{2} + e_2 + e_3 + e_4 < \frac{n \times l}{4}$$

the layer forming a colored filter, the glass or $SiO_2$ layer and the layer forming a polarizer forming said second transparent confinement means, placement of a reflector to reflect light passing through the second transparent confinement means on the free face of the layer forming a polarizer.

According to a first variant embodiment, during the structure manufacturing step, said first transparent confinement means used are confinement means comprising a glass strip and a layer forming a polarizer between their inner and outer faces. According to a second variant embodiment, during the structure manufacturing step, said first transparent confinement means used only include a glass strip, the process comprising an additional step subsequent to the support thinning step consisting of placing a polarizer on the glass strip of the first transparent confinement means, on the outer face of the structure.

The support may be thinned by a method chosen from among grinding, mechanical-chemical polishing and etching.

According to one variant embodiment, during the structure manufacturing step, the support used comprises said glass or $SiO_2$ layer with thickness $e_3$ and refraction index n separated from the remainder of the structure by a stop layer, the support thinning step consisting of firstly eliminating the remainder of the support and then eliminating the stop layer. The remainder of the support may be eliminated by chemical attack. The stop layer may be eliminated by etching.

According to another variant embodiment, during the structure manufacturing step, the support used includes said glass or $SiO_2$ layer with thickness $e_3$ and refraction index n separated from the remainder of the support by a separation layer, the thinning step of the support consisting of eliminating the remainder of the support as far as the separation layer.

If the said first confinement means during the structure manufacturing step, form part of the thick substrate, the method may then comprise a step for thinning this thick substrate to keep only the first confinement means.

Advantageously, during the structure manufacturing step, an active matrix is associated with the first transparent electrodes or the second transparent electrodes.

Another purpose of the invention is a method for manufacturing a flat liquid crystal screen comprising a liquid crystal layer confined between first transparent confinement means and second transparent confinement means, the method comprising the following steps:

manufacture of a structure comprising said first transparent confinement means and a support facing each other, said first transparent confinement means being provided with a face external to the structure that will receive light incident to the screen, and a face internal to the structure supporting a layer forming a colored filter composed of a mosaic of elements of width l, the layer forming a colored filter supporting first transparent electrodes for application of an electric field to the liquid crystal, the part of the support facing the first transparent confinement means being made of glass or $SiO_2$ with a refraction index n and supporting second transparent electrodes for application of an electric field to the liquid crystal, a liquid crystal layer with a thickness $e_1$ being confined between the second transparent confinement means and the layer forming a colored filter, thinning of the support to keep only a glass or $SiO_2$ layer with thickness $e_3$ and refraction index n supporting the second transparent electrodes, gluing of a layer forming a polarizer with thickness $e_4$ on the free face of the glass or $SiO_2$ layer, the parameters $e_1$, $e_2$, $e_3$, $e_4$ and l being chosen such that:

$$\frac{e_1}{2} + e_3 + e_4 < \frac{n \times l}{4}$$

the glass or $SiO_2$ layer and the layer forming the polarizer making up said second transparent confinement means, placement of a reflector designed to reflect light passing through the second transparent confinement means on the free face of the layer forming the polarizer.

According to a first variant embodiment, said first transparent confinement means used during the structure manufacturing step, are confinement means that comprise the layer forming a colored filter, a glass strip and a layer forming a polarizer, in sequence starting from their inner face and working towards their outer face. According to a second variant embodiment, said first transparent confinement means used during the structure manufacturing step include only a glass strip and the layer forming a colored filter, the process comprising an additional step subsequent to the support thinning step, consisting of placing a polarizer on the glass strip in the first transparent confinement means, on the outer face of the structure.

The structure may be thinned using a method chosen from among grinding, mechanical-chemical polishing and etching.

According to one variant embodiment, the support used during the structure manufacturing step comprises said glass or $SiO_2$ layer with thickness $e_3$ and refraction index n separate from the remainder of the structure by a stop layer, the support thinning step consisting of firstly eliminating the remainder of the support and then eliminating the stop layer. The remaining of the support can be eliminated by chemical attack. The stop layer can be eliminated by etching.

According to a first variant embodiment, the support used during the structure manufacturing step comprises said glass layer or $SiO_2$ layer with thickness $e_3$ and refraction index n separated from the remainder of the structure by a separation layer, the support thinning step consisting of eliminating the remainder of the support as far as the separation layer.

If said first confinement means during the structure manufacturing step form part of a thick substrate, the process may comprise a step to thin this fixed substrate and only keep the first confinement means.

Advantageously, an active matrix is associated with the first transparent electrodes or with the second transparent electrodes, during the structure manufacturing step.

BRIEF DESCRIPTION OF THE DRAWINGS

The invention will be better understood and other advantages and specific features will become clear after reading the description given below as a non-limitative example accompanied by the appended drawings among which.

DETAILED DESCRIPTION OF EMBODIMENTS OF THE INVENTION

The invention consists of sampling at least one of the very thin parts (screen and addressing circuit) forming the flat screen, and that are made on a rigid glass support, and then transferring them directly onto a reflective polarizer, in other words a polarizer associated with a thin reflective layer usually composed of a metallic film. The result is a very small distance between firstly the image plan composed of the liquid crystal layer itself located a few tens of a micrometer from the colored filters, and secondly the reflective plan. This proximity frees the optical system obtained from any parallax effect visible to the naked eye, provided that some geometric constraints are respected.

Figure 1:
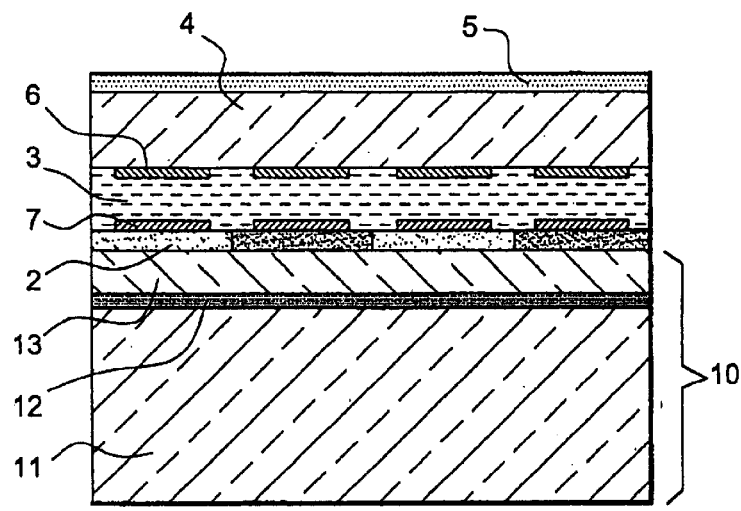
FIG. 1 is a cross sectional view of a stacked structure that will be used to make a liquid crystal flat screen according to the invention.

FIG. 1 is a cross sectional view of a stacked structure that will be used to make a flat liquid crystal screen according to the invention.

The structure is formed on a support 10 comprising a glass panel 11 supporting a first layer 12 and a second layer 13. The glass panel 11 may for example be a large panel like those used for manufacturing liquid crystal screens. It may be a 1737 glass panel made by Corning. A layer 12 is deposited on the panel 11 that will be used as a stop layer. The layer 12 may be made of amorphous or polycrystalline silicon and it may be 300 nm thick. These materials can be deposited by LPCVD. In some cases, an intermediate layer may be deposited onto panel 11 before the layer 12 is deposited, to facilitate adhesion. This intermediate layer may for example be a layer of silicon oxide.

The layer 13 is deposited on the layer 12. For example, it may be a layer of silicon oxide with a thickness varying for example from 0.5 µm to 5 µm. The nature of the layer 13 will be similar to the nature of the panel 11.

A liquid crystal screen is formed on a support 10 in exactly the same manner as that used to make a standard substrate. It may be advantageous to make at least all the control circuits on this support type. Typically, this technology does not involve temperatures exceeding 400° C.

The structure obtained comprises a colored filter 2 with thickness $e_2$ superposed on the support 10, composed of a mosaic of elements with width l, a liquid crystal layer 3, a glass strip 4 and a layer 5 forming polarizer and fixed by bonding. The glass strip 4 supports a set of electrodes 6 on the liquid crystal side. The colored filter 2 supports a set of electrodes 7 on the liquid crystal side.

Once the structure has been made, the support 10 is thinned. This thinning can be achieved using a technique chosen from among grinding, mechanical polishing, mechanical-chemical polishing, wet or a dry chemical attack, alone or a combination of these techniques. For example, the panel 11 may be ground to the thickness of about 80 µm and thinning may be continued using a solution of HF. The attack can be restricted to the face to be thinned, for example by using a "spin etcher", or the front and sides of the structure can be protected.

Figure 2:
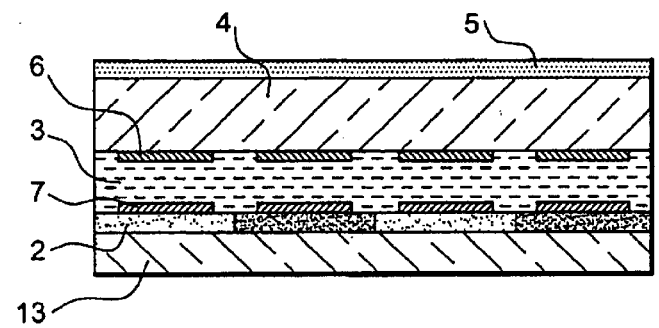
FIG. 2 shows the structure in FIG. 1 in a more advanced embodiment.

Once the panel 11 has been eliminated, etching stops on the silicon layer 12 that is not attacked by the HF solution. The layer may then be eliminated by etching (TMAH, KOH or other). TMAH is attractive since it has good attack selectivity with $SiO_2$. The structure shown in FIG. 2 is obtained.

In one variant embodiment, the layer 5 forming a polarizer may be glued after the support 10 has being thinned.

Figure 3:
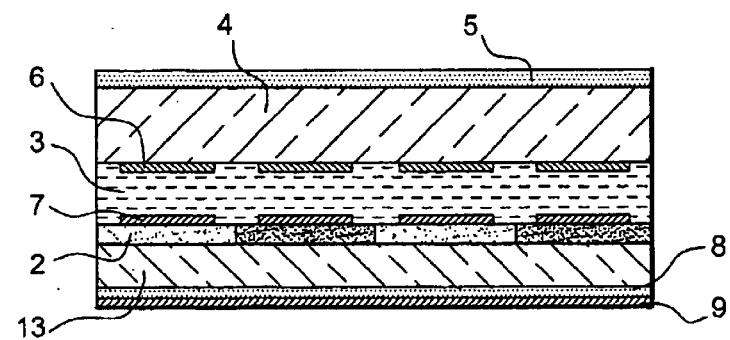
FIG. 3 shows a cross sectional view of a liquid crystal flat screen according to the invention.

FIG. 3 shows the flat screen obtained after the layer 8 forming a polarizer has been glued on the free face of the layer 13 and after the reflector 9 has been fixed on the free face of the layer 8, and the device can then operate in reflective mode.

The condition for not having any visible parallax effect can be expressed by the following relation:

$$\frac{e_1}{2} + e_2 + e_3 + e_4 < \frac{n \times 1}{4}.$$

where:

$e_1$ thickness of the liquid crystal 3, $e_2$ thickness of the colored filter 2, $e_3$ thickness of the layer 13, $e_4$ thickness of the layer 8, n refraction index of the layer 13, l width of the colored filter 2 element.

The thickness $e_4$ of the layer 8 forming a polarizer may be 5 μm. The thickness $e_2$ of the colored filter 2 may be 1 μm and the width l of an element may be 50 μm. The colored filter 2 may support transparent electrodes 7 made of approximately 0.1 μm thick ITO. The thickness $e_1$ of the liquid crystal layer 3 may be 5 μm.

Under these conditions, if the refraction index n of the layer 13 is equal to 1.4, the thickness $e_3$ of the layer 13 must be less than 9 μm.

What is claimed is:

1. Liquid crystal flat screen operating in reflective mode comprising a liquid crystal layer with thickness $e_1$ confined between first transparent confinement means and second transparent confinement means, the first transparent confinement means being provided with an outer face that will receive incident light arriving on the screen, and an inner face supporting first transparent electrodes used to apply an electric field to the liquid crystal, the second transparent confinement means being provided with an outer face supporting a reflector that will reflect light passing through the second transparent confinement means, and an inner face supporting second transparent electrodes for application of an electric field to the liquid crystal, characterized by one of the following alternatives:

either, the second transparent confinement means comprise a layer between their inner and outer faces, forming a colored filter with thickness $e_2$ and composed of a mosaic of elements with width l, a layer of glass or $SiO_2$ with thickness $e_3$ and refraction index n and a layer forming a polarizer with thickness $e_4$, the parameters $e_1$, $e_2$, $e_3$, $e_4$ and l being chosen such that:

$$\frac{e_1}{2} + e_2 + e_3 + e_4 < \frac{n \times 1}{4},$$

or, the first transparent confinement means comprise a layer between their inner and outer faces forming a colored filter composed of a mosaic of elements with width l, and the second transparent confinement means comprise a glass or $SiO_2$ layer between their inner and outer faces with thickness $e_3$ and refraction index n, and a layer forming a polarizer with thickness $e_4$, the parameters $e_1$, $e_3$, $e_4$ and l being chosen such that:

$$\frac{e_1}{2} + e_3 + e_4 < \frac{n \times 1}{4}.$$

2. Liquid crystal flat screen according to claim 1, in which the reflector is a metallic film.

3. Liquid crystal flat screen according to claim 1, in which the layer forming the polarizer of the second transparent confinement means is made of plastic.

4. Liquid crystal flat screen according to claim 1, in which the first transparent confinement means comprise a glass strip and a layer forming a polarizer between their inner and outer faces.

5. Liquid crystal flat screen according to claim 4, in which the layer forming a polarizer of the first transparent confinement means is made of plastic material.

6. Liquid crystal flat screen according to claim 1, in which the first transparent confinement means or the second transparent confinement means support an active matrix associated with the transparent electrodes supported by these transparent confinement means.

7. Method for manufacturing a liquid crystal flat screen comprising a liquid crystal layer confined between the first transparent confinement means and the second transparent confinement means, the method comprising the following steps:

make a structure comprising said first transparent confinement means facing a support, said first transparent confinement means being provided with an outer face external to the structure that will receive light incident to the screen, and a face internal to the structure supporting first transparent electrodes for application of an electric field to the liquid crystal, the part of the support facing the first transparent confinement means being made of glass or $SiO_2$ with a refraction index n and supporting a layer forming a colored filter with thickness $e_2$ and composed of a mosaic of elements with width l, the layer forming the colored filter supporting second transparent electrodes for application of an electric field to the liquid crystal, a layer of liquid crystal with thickness $e_1$ being confined between the first transparent confinement means and the layer forming a colored filter, thinning of the support to keep only a glass or $SiO_2$ layer with thickness $e_3$ and refraction index n adjacent to the layer forming a colored filter, gluing of a layer forming a polarizer with thickness $e_4$ on the free face of the glass layer or $SiO_2$ layer, the parameters $e_1$, $e_2$, $e_3$, $e_4$ and l being chosen such that:

$$\frac{e_1}{2} + e_2 + e_3 + e_4 < \frac{n \times 1}{4}$$

the layer forming a colored filter, the glass or $SiO_2$ layer and the layer forming a polarizer forming said second transparent confinement means, placement of a reflector to reflect light passing through the second transparent confinement means on the free face of the layer forming a polarizer.

8. Method according to claim 7, in which, during the structure manufacturing step, said first transparent confinement means used are confinement means comprising a glass strip and a layer forming a polarizer between their inner and outer faces.

9. Method according to claim 7, in which, during the structure manufacturing step, said first transparent confinement means used only include a glass strip, the method comprising an additional step subsequent to the support thinning step, consisting of placing a polarizer on the glass strip of the first transparent confinement means, on the outer face of the structure.

10. Method according to claim 7, in which the support is thinned by a method chosen from among grinding, mechanical-chemical polishing and chemical attack.

11. Method according to claim 7, in which, during the structure manufacturing step, the support used comprises said glass or $SiO_2$ layer with thickness $e_3$ and refraction index n separated from the remainder of the support by a stop layer, the support thinning step consisting of firstly eliminating the remainder of the support and then eliminating the stop layer.

12. Method according to claim 11, characterized in that the remainder of the support is eliminated by chemical attack.

13. Method according to claim 11, in which the stop layer is eliminated by etching.

14. Method according to claim 7, in which, during the structure manufacturing step, the support used includes said glass or $SiO_2$ layer with thickness $e_3$ and refraction index n separated from the remainder of the support by a separation layer, the thinning step of the support consisting of eliminating the remainder of the support as far as the separation layer.

15. Method according to claim 7, in which, during the structure manufacturing step, said first confinement means form part of the thick substrate, the method then also comprising a step for thinning this thick substrate to keep only the first confinement means.

16. Method according to claim 7, in which, during the structure manufacturing step, an active matrix is associated with the first transparent electrodes or the second transparent electrodes.

17. Method for manufacturing a flat liquid crystal screen comprising a liquid crystal layer confined between first transparent confinement means and second transparent confinement means, the method comprising the following steps:

manufacture of a structure comprising said first transparent confinement means and a support facing each other, said first transparent confinement means being provided with a face external to the structure that will receive light incident to the screen, and a face internal to the structure supporting a layer forming a colored filter composed of a mosaic of elements of width l, the layer forming a colored filter supporting first transparent electrodes for application of an electric field to the liquid crystal, the part of the support facing the first transparent confinement means being made of glass or $SiO_2$ with a refraction index n and supporting second transparent electrodes for application of an electric field to the liquid crystal, a liquid crystal layer with a thickness $e_1$ being confined between the second transparent confinement means and the layer forming a colored filter, thinning of the support to keep only a glass or $SiO_2$ layer with thickness $e_3$ and refraction index n supporting the second transparent electrodes, gluing of a layer forming a polarizer with thickness $e_4$ on the free face of the glass or $SiO_2$ layer, the parameters $e_1$, $e_3$, $e_4$ and l being chosen such that:

$$\frac{e_1}{2} + e_3 + e_4 < \frac{n \times l}{4}$$

the glass or $SiO_2$ layer and the layer forming the polarizer making up said second transparent confinement means, placement of a reflector designed to reflect light passing through the second transparent confinement means on the free face of the layer forming the polarizer.

18. Method according to claim 17, in which, during the structure manufacturing step, said first transparent confinement means used are confinement means that comprise the layer forming a colored filter, a glass strip and a layer forming a polarizer, between their inner and outer faces.

19. Method according to claim 17, in which, during the structure manufacturing step, said first transparent confinement means used include only a glass strip and the layer forming a colored filter, the method comprising an additional step subsequent to the support thinning step, consisting of placing a polarizer on the glass strip in the first transparent confinement means, on the outer face of the structure.

20. Method according to claim 17, in which, the support is thinned using a method chosen from among grinding, mechanical-chemical polishing and chemical attack.

21. Method according to claim 17, in which, during the structure manufacturing step, the support used comprises said glass or $SiO_2$ layer with thickness $e_3$ and refraction index n separate from the remainder of the structure by a stop layer, the support thinning step consisting of firstly eliminating the remainder of the support and then eliminating the stop layer.

22. Method according to claim 21, in which the remaining of the support is eliminated by chemical attack.

23. Method according to claim 21, in which the stop layer is eliminated by etching.

24. Method according to claim 17, in which, during the structure manufacturing step, the support used comprises said glass layer or $SiO_2$ layer with thickness $e_3$ and refraction index n separated from the remainder of the structure by a separation layer, the support thinning step consisting of eliminating the remainder of the support as far as the separation layer.

25. Method according to claim 17, in which, during the structure manufacturing step, said first confinement means form part of a thick substrate, the method then comprising a step to thin this fixed substrate to only keep the first confinement means.

26. Method according to claim 17, in which, during the structure manufacturing step, an active matrix is associated with the first transparent electrodes or with the second transparent electrodes.

* * * * *